United States Patent [19]

Prewo et al.

[11] Patent Number: 4,666,645

[45] Date of Patent: May 19, 1987

[54] METHOD FOR FORMING FIBER REINFORCED COMPOSITE ARTICLES

[75] Inventors: Karl M. Prewo, Vernon; George K. Layden, Wethersfield, both of Conn.

[73] Assignee: United Technologies Corporation, Hartford, Conn.

[21] Appl. No.: 602,285

[22] Filed: Apr. 20, 1984

[51] Int. Cl.$^4$ ............................................. B29C 43/18
[52] U.S. Cl. ..................... 264/87; 156/62.2; 156/89; 162/145; 162/156; 264/517; 264/113; 264/125; 264/152; 264/258; 264/324; 264/325; 264/332
[58] Field of Search ............... 264/324, 325, 332, 103, 264/87, 113, 86, 118, 122, 125, 152, 258, DIG. 57, 29.1, 29.5, 29.2, 517, 60, 63; 156/73.6, 89, 62.2; 162/145, 156

[56] References Cited

U.S. PATENT DOCUMENTS

| | | | |
|---|---|---|---|
| 2,155,375 | 4/1939 | Jablonsky | 264/325 |
| 3,367,812 | 2/1968 | Watts | 264/29.5 |
| 4,032,607 | 6/1977 | Schulz | 264/29.3 |
| 4,041,116 | 8/1977 | Baud et al. | 264/517 |
| 4,064,207 | 12/1977 | De Crescente et al. | 264/517 |
| 4,080,413 | 3/1978 | Layden et al. | 264/29.7 |
| 4,083,913 | 4/1978 | Marshall | 264/122 |
| 4,241,007 | 12/1980 | Tanaka | 264/324 |
| 4,279,952 | 7/1981 | Kodama et al. | 264/29.5 |
| 4,309,245 | 1/1982 | Tworek | 264/332 |
| 4,350,672 | 9/1982 | Layden et al. | 264/29.2 |
| 4,412,854 | 11/1983 | Layden | 264/125 |
| 4,428,763 | 1/1984 | Layden | 264/125 |
| 4,464,192 | 8/1984 | Layden et al. | 264/125 |

*Primary Examiner*—Jeffery Thurlow
*Attorney, Agent, or Firm*—Alan C. Cohen

[57] ABSTRACT

The present invention discloses a process of forming glass, glass-ceramic or ceramic matrix, fiber reinforced composite articles. The method comprises preparing both the matrix and the reinforcement into fibers, which are then chopped into relatively short lengths. These chopped fibers are then formed into hybrid felt papers comprising a mixture of both reinforcing fibers and matrix fibers. These felt papers are then cut into preforms and stacked one on top of the other to form a lay-up. The lay-up is then placed in a die and densified to form the composite article.

3 Claims, No Drawings

METHOD FOR FORMING FIBER REINFORCED COMPOSITE ARTICLES

CROSS REFERENCE TO RELATED APPLICATIONS

This application relates to U.S. application Ser. No. 602,284, filed on even date herewith by George K. Layden and Karl M. Prewo for METHOD FOR FORMING COMPOSITE ARTICLES OF COMPLEX SHAPES, now U.S. Pat. No. 4,613,473 issued Sept. 23, 1986.

TECHNICAL FIELD

The field of art to which this invention pertains is molding processes, and particularly molding processes for forming fiber reinforced composite articles.

BACKGROUND ART

Due to the increasing cost as well as the increasing scarcity of many conventional metals used in the formation of high temperature structural components, increased emphasis has been placed on fiber reinforced composite articles which can take the place of their metal counterparts.

Techniques have been disclosed which describe fabrication processes for making fiber reinforced glass or glass-ceramic composites, four of which are commonly assigned U.S. Pat. Nos. 4,314,852; 4,412,854; 4,428,763; and 4,324,843, the disclosures of which are incorporated by reference herein.

Typically, such techniques incorporate the preparation of the matrix material into a slurry with an organic binder, drawing the reinforcing fibers through the slurry, coating the fibers, winding the coated fibers on a take-up reel, and drying the coated fibers forming a matrix impregnated tape. The matrix impregnated tape is then cut into desired lengths or shapes and laid up in proper fiber orientation, after which they are placed in an oven to burn off the binder. Then the lay-up is carefully placed in a mold and densified under heat and pressure forming the composite.

There are a number of disadvantages associated with this composite article manufacturing technique. One is that the removal of the organic binder which is used with the slurry matrix to improve the adhesion of the matrix to the fibers during the tape forming step, introduces an extra step which adds labor costs as well as energy costs to the process. In addition, such fugitive binders can be a source of unwanted impurities in the resultant composite. Another disadvantage is that the preparation of the slurry and its application onto the fibers, as well as the formation of the tape, is time-consuming and adds additional costs to the final article. Thirdly, the matrix is not always uniformly applied to the fibers, which may then create a nonuniform composite article. In addition, with the use of these processes, complex or three-dimensional composite structures are difficult to make.

Therefore, what is needed in this art is a method of manufacturing fiber reinforced composite articles which is less complex, less labor and energy intensive and allows for easier production of complex composite articles.

DISCLOSURE OF INVENTION

The present invention discloses a method of making glass, glass-ceramic and ceramic matrix fiber reinforced composite articles. The method comprises forming both the matrix and the reinforcing material into chopped fibers, then preparing homogenous felt papers of both the matrix and the reinforcing chopped fibers using conventional techniques. The matrix and reinforcing felt papers are then cut into predetermined shapes or preforms and the preforms are stacked to form a lay-up. The lay-up structure is then placed into a die and densified under sufficient pressure and temperature to cause the matrix material to flow throughout the reinforcing felt papers forming the composite article.

In addition, the felt used to practice this invention can be formed as a hybrid felt paper comprised of a mixture of matrix fibers and reinforcing fibers. Said hybrid felt paper may then be cut into predetermined preforms, which are then stacked in a lay-up, placed in a die, and under sufficient temperature and pressure, the matrix material is caused to flow about the reinforcing fibers, thus forming the composite article.

Other features and advantages of the invention will be apparent from the specification and claims.

BEST MODE FOR CARRYING OUT THE INVENTION

Any glass, glass-ceramic or ceramic material which can be formed into fibers, may be used as the matrix material. The choice of which material to use will depend on the particular properties desired in the final composite article. Some of the matrices will have greater thermal stability, higher fracture toughness or will be more comparable with a particular reinforcing fiber. These features, as well as others, will determine which matrix to select. For instance, when forming a composite of glass-ceramic matrix and silicon carbide fibers, the matrix material must be substantially titanium free in order to form a satisfactory composite. A number of glass matrices which may prove useful are E-Glass, Corning 1723 aluminosilicate, Corning 7740 borosilicate glass and Corning 7930 high silica content glass (96% by weight silica). In addition, some glass-ceramic matrices are lithium aluminosilicate, aluminosilicate and magnesium aluminosilicate, while an example of a ceramic material is mullite.

The glass, glass-ceramic or ceramic matrix is then formed into fibers by any conventional techniques, such as spinning, which would produce continuous fibers or blowing which would produce short or chopped fibers. The diameters and lengths of the fibers which are produced may vary as may the shape (i.e. flat, oval, round, etc.). However, it is preferred that the fibers be substantially round in shape and have a diameter ranging from about 1 micron to about 25 microns with 5 microns to 15 microns especially preferred.

The fiber reinforcement may be any conventional composite reinforcement materials, i.e. carbon, graphite, silicon carbide, silicon nitride, alumina, etc. The limiting factor in selecting the reinforcement material is its thermal compatibility with the temperatures required to densify the matrix and physical compatibility, i.e. the closely matching coefficients of thermal expansion of both the matrix and reinforcement, compatible reactivities, etc. The particular reinforcement material chosen will also depend on the properties desired in the final composite article.

The reinforcement material is formed into continuous or short length fibers using any conventional technique. The diameters and lengths of the fibers produced may vary as may the shape (i.e. flat, oval, circular, etc.), and are not critical to practicing the invention. However, it is preferred that the fibers be substantially round, and have diameters of about 5 microns to about 200 microns.

The matrix and reinforcement fibers are then chopped or cut into the desired lengths, using any conventional technique to form chopped fibers. The length of the fibers will vary depending on the size of the structure to be formed and the ultimate properties desired in the composite article. Typically, these chopped fibers will range from about 0.25 inch to about 4 inches. The chopped fibers are then formed into a nonwoven "felt" paper by randomly accumulating the fibers in a stack. This may be done using vacuum or pressure or any other conventional technique which will create these nonwoven papers. The formation of such felt paper is known and does not constitute part of this invention. Typically, this is done by suspending the chopped fiber in a liquid (water) and then placing the suspension onto a screen or strainer and removing the liquid by suction, leaving on the screen, the fiber in a nonwoven, random felt paper.

These felt papers may be homogenous in nature for example, containing only matrix fibers or reinforcement fibers or they may be hybrid felt papers comprised of a mixture of both matrix and reinforcing fibers.

The thicknesses and the density of the felt papers is limited only to the ability to process the felt papers into an acceptable composite article. Typically, this means that the matrix material is capable of substantially uniformly penetrating the felt papers and surrounding the fiber reinforcement. In many cases, these felt papers will have thicknesses in the range of about 5 mils to about 10 mils.

It should be apparent that the felt paper forming steps may be eliminated by merely purchasing the matrix and reinforcement material in felt paper form commercially.

After the felt papers have been formed, they may be cut into predetermined shapes called preforms. These preforms are then stacked to form a lay-up. In the case where homogenous felt papers are used, the fiber reinforcement felt papers should be interleaved with one or more of the matrix felt papers. This interleaving is done to allow for the matrix material, during densification, to become uniformly distributed throughout the composite article. Since the composite articles typically comprise about 30% to about 70% by volume of matrix material, with the preferred range about 40% to about 60% by volume, the number and density of each type of felt preforms should be chosen accordingly, to form a composite having this composition.

It should be apparent that when a hybrid felt paper of a mixture of the matrix fibers and the reinforcement fibers is used, it is not necessary to interleave the preforms in the lay-up as the matrix material is already distributed throughout the reinforcement fibers. When using hybrid felt papers to form composite articles, it should be apparent that composition of such felt papers should reflect the composition of the final article. For example, if the final article requires that its composition be 50% reinforcement and 50% matrix, then the felt paper should be formed to contain 50% matrix fibers and 50% reinforcement fibers.

It should also be apparent that when hybrid felt papers are used, the upper limit of the felt paper thickness is only limited by the capacity of the hot pressing dies.

The densification process for the hybrid felt paper lay-ups and the homogenous felt paper lay-ups is the same. The temperatures, pressures and residence times to which the lay-ups are subjected should be high enough to soften the matrix material and cause it to flow around the fibers but not so high so as to damage the reinforcing fibers themselves. Typically, the pressure ranges from about 1.7 to about 13.8 MPa (250 to 2,000 psi) and temperatures of about 1050° C. to about 1700° C. with residence times of about 15 minutes for glass, glass-ceramic matrices, or ceramic matrices. A preferred pressure range is about 3.4 MPa to about 6.9 while a preferred temperature range is from about 1100° C. to 1500° C. These conditions will vary depending on the article being formed.

This method will allow for a simpler way to form composite articles, by eliminating the labor and energy-intensive steps of forming the slurry with the binder and then the impregnated tapes.

It should be understood that the invention is not limited to the particular embodiments shown and described herein, but that various changes and modifications may be made without departing from the spirit and scope of this novel concept as defined by the following claims.

We claim:

1. A method of making fiber reinforced glass, glass-ceramic or ceramic matrix composite articles comprising:

forming a matrix material into chopped matrix fibers having diameters of about 1 micron to about 25 microns, forming the chopped matrix fibers into a matrix felt paper, forming a fiber reinforcing material into chopped reinforcing fibers, forming the chopped reinforcing fibers into a fiber reinforcing felt paper, cutting the matrix felt papers and the fiber reinforcing felt papers into matrix preforms and reinforcing preforms of predetermined shapes, interleaving said matrix preforms with said fiber reinforcing preforms forming a lay-up, and placing said lay-up into a die and applying sufficient heat and pressure to cause the matrix material to flow about the reinforcing fibers forming the composite article.

2. The method of claim 1 wherein the matrix material comprises from about 30% to about 70% by volume of the composite article.

3. A method of making fiber reinforced glass, glass-ceramic or ceramic matrix composite articles comprising:

forming a matrix material into chopped matrix fibers having diameters of about 1 micron to about 25 microns, forming a reinforcing material into chopped fibers, forming a felt paper of the matrix fibers and the reinforcement fibers, wherein the matrix fibers comprise about 30% to about 70% by volume of the felt paper, forming the felt paper into preforms of predetermined shapes, forming a lay-up of one or more of the preforms, and placing the lay-up in a die and with sufficient temperature and pressure to cause the matrix to flow about the reinforcing fiber, thus forming the composite article.

* * * * *